(12) United States Patent
Yamamoto

(10) Patent No.: US 6,718,075 B1
(45) Date of Patent: Apr. 6, 2004

(54) IMAGE SEARCH METHOD AND APPARATUS

(75) Inventor: Kunihiro Yamamoto, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 689 days.

(21) Appl. No.: 09/698,464

(22) Filed: Oct. 27, 2000

(30) Foreign Application Priority Data

Oct. 28, 1999 (JP) .......................................... 11-307527

(51) Int. Cl.[7] ................................................. G06K 9/54
(52) U.S. Cl. ....................................... 382/305; 345/835
(58) Field of Search ............................... 382/305, 217, 382/209, 307; 348/179, 177; 345/781, 783, 810, 835, 838, 557

(56) References Cited

U.S. PATENT DOCUMENTS 5,751,286 A * 5/1998 Barber et al. ................ 345/835
6,335,746 B1 * 1/2002 Enokida et al. .............. 345/839
6,463,432 B1 * 10/2002 Murakawa ....................... 707/5
6,567,551 B2 * 5/2003 Shiiyama ..................... 382/217
6,584,223 B1 * 6/2003 Shiiyama ..................... 382/173

* cited by examiner

*Primary Examiner*—Yon J. Couso
(74) *Attorney, Agent, or Firm*—Robin, Blecker & Daley (57) ABSTRACT

An image search apparatus searches image data based on an input search condition, and displays a graphic view of plural images based on plural image data obtained as search results. In this view display, when plural image data are obtained by a new search, the view displayed images are respectively updated. Upon update of the display of each of the displayed images, if the image data of the displayed image is the same as the image data of an image to be displayed after the update, the execution of a update display is prohibited. Thus, the display of previous search results are effectively utilized, and the speed of view display of images as search results is increased, and an efficient image search operation can be realized.

21 Claims, 11 Drawing Sheets

IMAGE SEARCH METHOD AND APPARATUS

FIELD OF THE INVENTION

The present invention relates to an image search method and apparatus for finding a desired image from plural images.

BACKGROUND OF THE INVENTION

Various search means have been proposed for searching a database having a large number of image data for a desired image. These search means are briefly classified into:

search methods to link an image with non-image information such as a keyword or date of image sensing, and perform a search based on the information; and search methods to perform a search based on a feature amount (luminance and color difference information, an image frequency, a histogram and the like) of the image itself.

Among the latter search methods, a method to present an image and search a database with a feature amount of the image as a search key, is called a similar image search. This method has an advantage that a user without particular image processing knowledge is provided with an intuitive interface.

Further, in the similar image search, it has been proposed to perform an image search by using an image obtained by drawing with a pointing device or the like as a similar image search source.

The result of image search is notified to an operator by a graphic view of reduced images or thumb-nail images. The operator is informed of the contents of images found by the search to a certain degree from the notification, and easily obtains desired image data (file).

However, in any of the image search based non-image information and the image search based on image information, a desired image may not be obtained by one search operation. In this case, the search condition is changed and the image search is performed again, and, the above view display is updated in accordance with the search result.

Upon view display of images, reduced images are generated from found image data and displayed, or low-resolution data previously held by the found image data are extracted and displayed. For the purpose of view display, considerable processing time is required. Especially, in a case where the image search is repeated to obtain a desired image, if it takes much time for the view display in each notification of search result, an efficient search operation is disturbed even though image search processing itself is made at a high speed.

SUMMARY OF THE INVENTION

The present invention has been made in consideration of the above problems, and has as its object to increase the speed of view display as a search result notification and enable an efficient image search operation.

According to one aspect of the present invention, the foregoing object is attained by providing an image search apparatus comprising: search means for performing an image data search based on an input search condition; display means for displaying a view of plural images indicating plural image data obtained from the search by the search means; update means for updating the view displayed by the display means based on image data obtained from a new search by the search means; determination means for determining whether or not each of the plural images displayed by the display means is the same as an image after an update by the update means; and control means for, if the determination means determines that the displayed image is the same as the image after the update by the update means, skipping the update by the update means.

Further, according to another aspect of the present invention, the foregoing object is attained by providing an image search method comprising: a search step of performing an image data search based on an input search condition; a display step of displaying a view of plural images indicating plural image data obtained from the search at the search step; an update step of updating the view displayed at the display step based on image data obtained from a new search at the search step; a determination step of determining whether or not each of the plural images displayed at the display step is the same as an image after an update at the update step; and a control step of, if it is determined at the determination step that the displayed image is the same as the image after the update at the update step, skipping the update at the update step.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

First Embodiment

Figure 1:
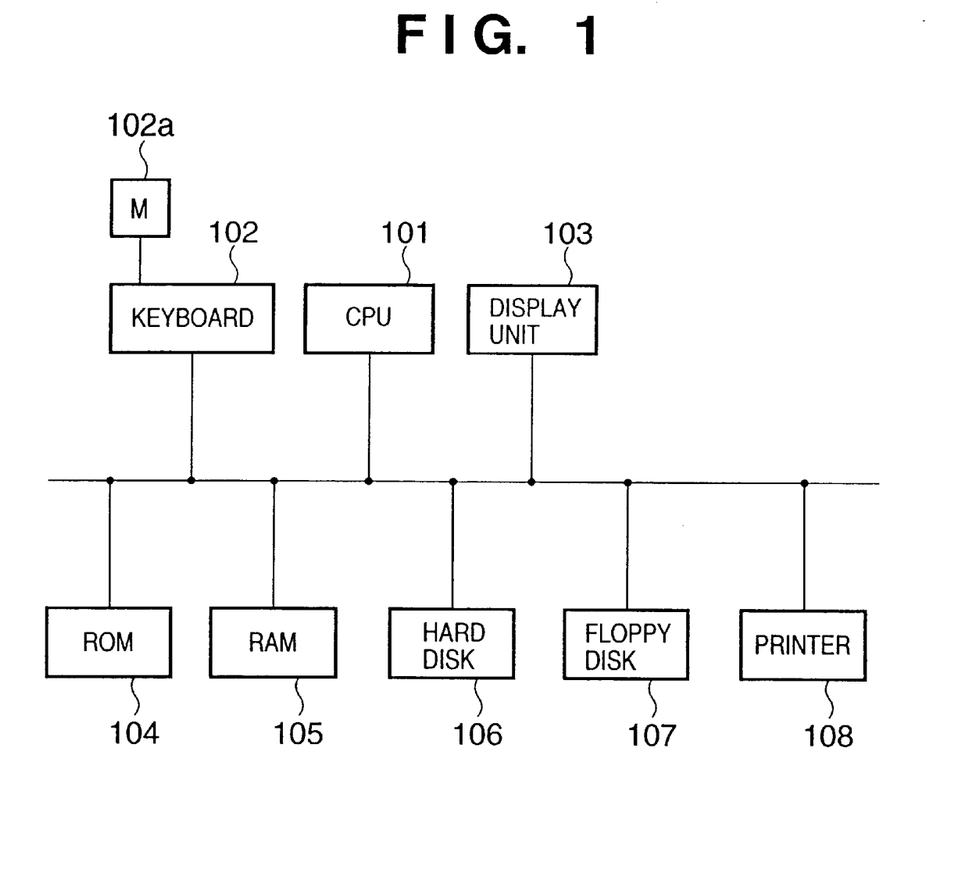
FIG. 1 is a block diagram showing the construction of a computer system according to a first embodiment of the present invention.

FIG. 1 is a block diagram showing the construction of a computer system according to a first embodiment of the present invention. In FIG. 1, reference numeral 101 denotes a CPU which controls the entire system; 102, a keyboard which is used with a pointing device 102a (it is a mouse in the present embodiment) for inputting a user's operation instruction into the system; 103, a display unit having a CRT, a liquid-crystal display and the like; 104 and 105, ROM and RAM as storage devices of the present system for storing programs executed by the system and data used by the system; 106 and 107, a hard disk device and a floppy disk device as external storage devices used in a file system of the present system; and 108, a printer.

Next, image search processing according to the present embodiment executed by the computer system having the above construction will be described.

Figure 2:
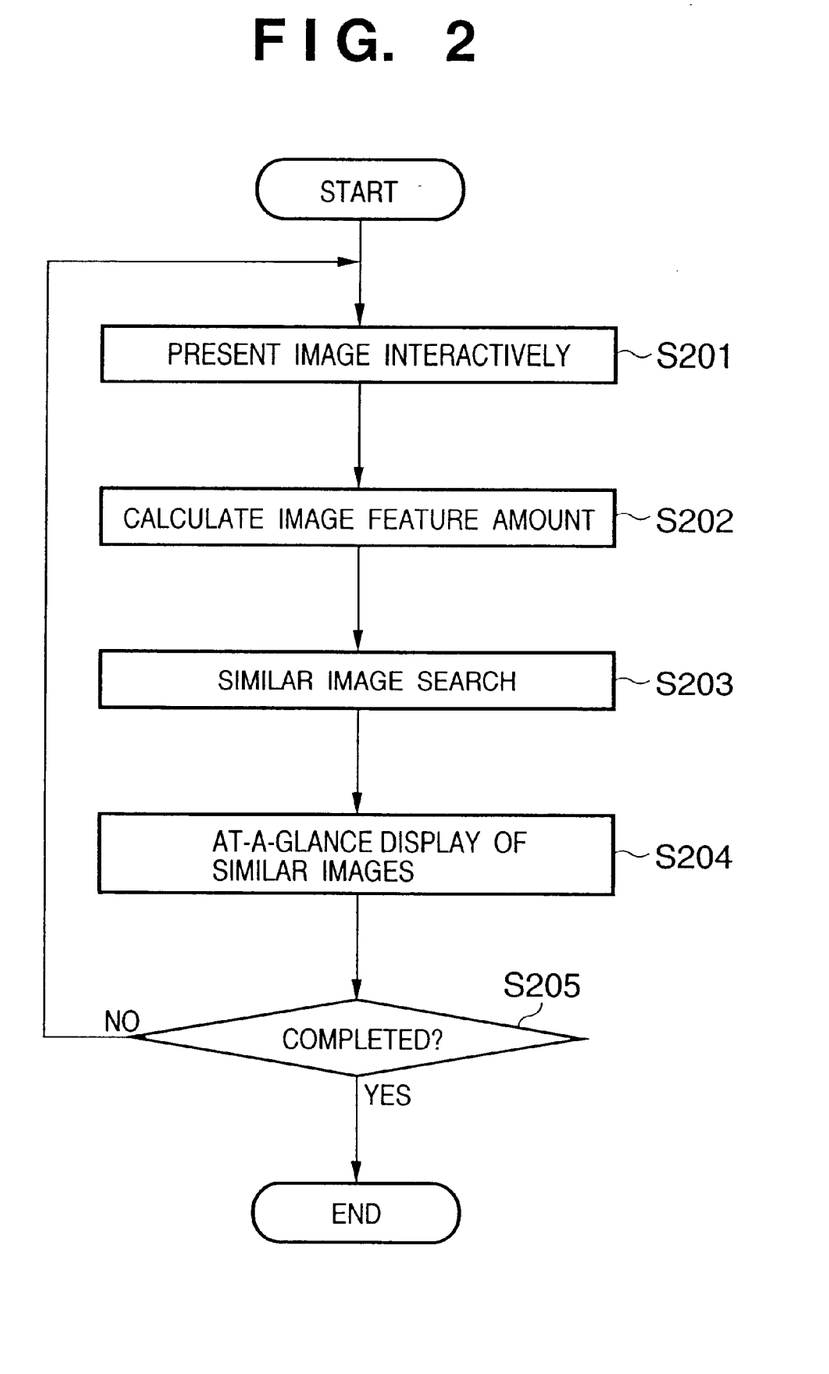
FIG. 2 is a flowchart showing a brief flow of image search processing according to the first embodiment.

FIG. 2 is a flowchart showing a brief flow of the image search processing according to the first embodiment. First, at step S201, the user draws an illustration similar to a desired image on the display device 103. Next, at step S202, a feature amount of the drawn image is calculated. Next, at step S203, a search for similar images is performed based on the calculated feature amount. At step S204, similar images obtained by the search are displayed on the display device 103. At step S205, it is determined whether or not the search operation is to be terminated. If the search operation is to be continued, the process returns to step S201, otherwise, the process ends.

Next, the respective steps will be described in detail.

[Step S201]

Figure 3:
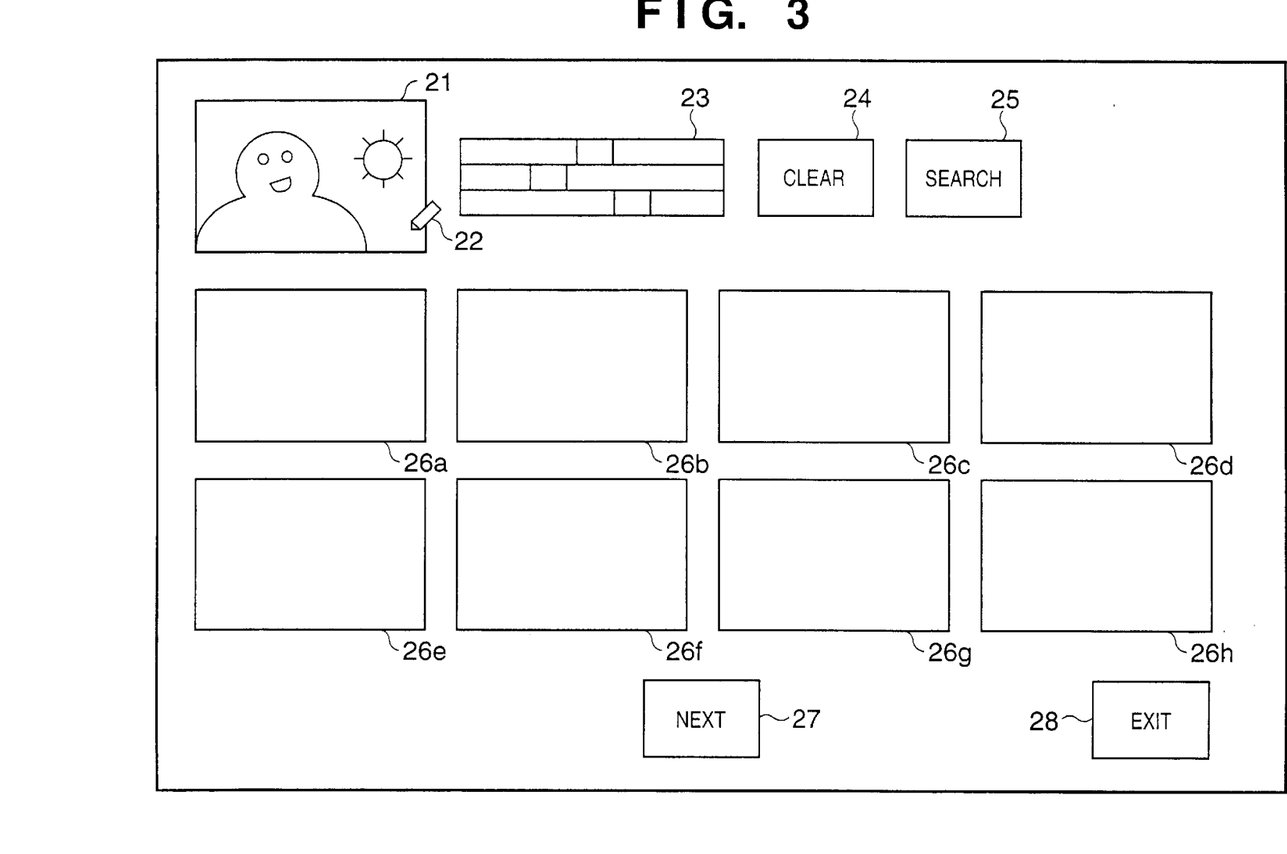
FIG. 3 is a schematic diagram showing an example of a user interface according to the first embodiment.

At step S201, first, an operation image as shown in FIG. 3 as a user interface is displayed on the display device 103. FIG. 3 is a schematic diagram showing an example of the user interface according to the present embodiment.

In FIG. 3, numeral 21 denotes a drawing area in which the user draws an image as a search source; 22, a drawing pen as a tool for drawing in the user drawing area 21, operated by using a mouse 102a; and 23, a color designation scroll bar for setting a color of drawing by using the drawing pen 22 in the drawing area 21. Numeral 24 denotes a Clear button. When this button is clicked, the content of drawing in the drawing area 21 is cleared. Numeral 25 denotes a Search button used for instruction to execute a search. Note that in the present embodiment, the system has a first mode to automatically repeat execution of similar image search with an image drawn in the drawing area 21 as a search source image while the user draws the image in the drawing area 21, and a second mode to start the similar image search with an image drawn in the drawing area 21 as a search source image in accordance with a click on the Search button 25. In the following explanation, control in the first mode will be described. The first mode differs from the second mode only in the way of starting the similar image search, but the other processings in the first mode are applied to the second mode.

Numerals 26a to 26h denote search result display areas to display reduced images or thumbnail images and the like of image data obtained from the search processing. The display notifies the user of the contents of images as obtained from the search to a certain degree, and enables the user to easily determine whether or not desired image data (file) is included. Numeral 27 denotes a Next button for the next view of found candidate images. Numeral 28 denotes an Exit button used for instruction to terminate the image search.

Then at step S201, the above operation image is used by the user to draw an illustration in the drawing area 21.

Figure 4:
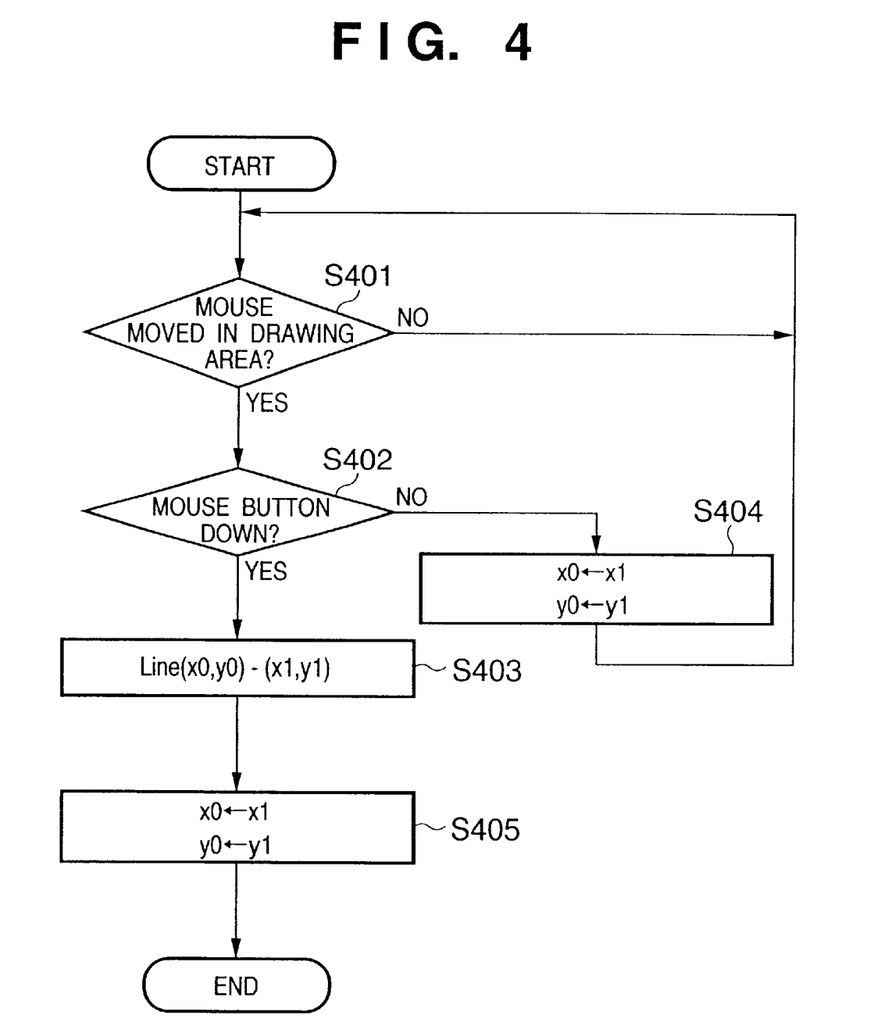
FIG. 4 is a flowchart showing image drawing processing in a drawing area.

FIG. 4 is a flowchart showing image drawing processing in the drawing area. Note that in the following description, values x0 and y0 are variables for storing an immediately previous position of a mouse pointer; and x1 and y1, variables for storing a current position of the mouse pointer.

At step S401, it is determined whether or not the drawing pen 22 has been moved in the drawing area 21 by the user's manipulating the mouse 102a. If the drawing pen 22 has not been moved, step S401 is repeated until it is determined that the drawing pen has been moved, then the process proceeds to step S402. That is, a loop to monitor the movement of the drawing pen 22 in the drawing area 21 is formed, and if the drawing pen 22 has been moved, the process proceeds to step S402.

At step S402, it is determined whether or not a mouse button of the mouse 102a is depressed. If the mouse button is not depressed, the process proceeds to step S404, at which the current mouse pointer position (x1,y1) is substituted into the immediately previous mouse pointer position (x0,y0). Then the process returns to step S401. Thus, the mouse pointer can be simply moved without drawing.

On the other hand, if it is determined at step S402 that the mouse button is depressed, as it is understood that a drag operation is being performed, the process proceeds to step S403. Then, a straight line is drawn in a color designated by the color designation scroll bar 23 between the immediately previous mouse pointer position (x0,y0) and the current mouse pointer position (x1,y1).

Next, at step S405, the current mouse pointer position (x1,y1) is substituted into the immediately previous mouse pointer position (x0,y0), and then the processing at step S201 ends, and the process proceeds to step S202.

As a result, to the user's eyes, the search is automatically performed every time when the user adds a little drawing to the illustration. Note that in the flowchart of FIG. 4, the similar image search is performed at every line drawing, however, the execution of the similar image search is not limited to this timing. For example, it may be arranged such that after the step S405, it is determined whether or not the similar image search is to be performed, and if the search is to be performed, the processing in FIG. 4 is terminated, otherwise, the process returns to step S401. The execution of similar image search may be determined by, monitoring elapse of predetermined period (e.g., the search is performed at predetermined intervals), monitoring a drawing amount in the drawing area 21 (e.g., determining to perform or not to perform the search based on whether or not drawing for a predetermined number of dots has been made), or monitoring pen-up timing (e.g., the search is performed when the depressed state of the mouse button has been released).

[Step 202]

At step S202, the image feature amount of the illustration drawn in the drawing area 21 is calculated. The procedure for calculating the image feature amount according to the present embodiment will be described below.

Figure 5:
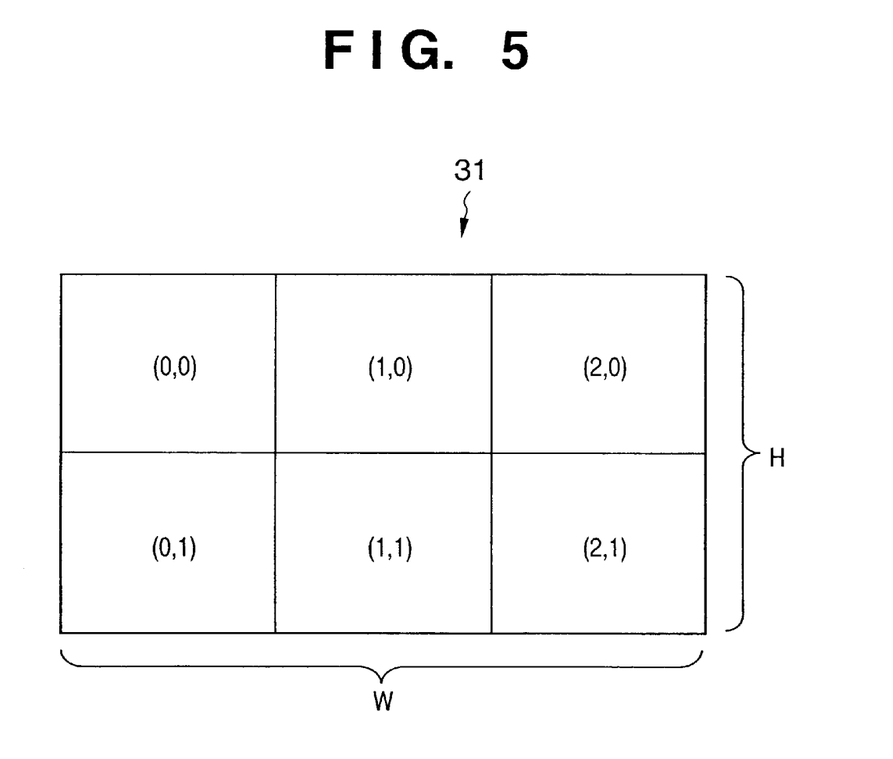
FIG. 5 is an explanatory diagram of image division according to the first embodiment.
Figure 6:
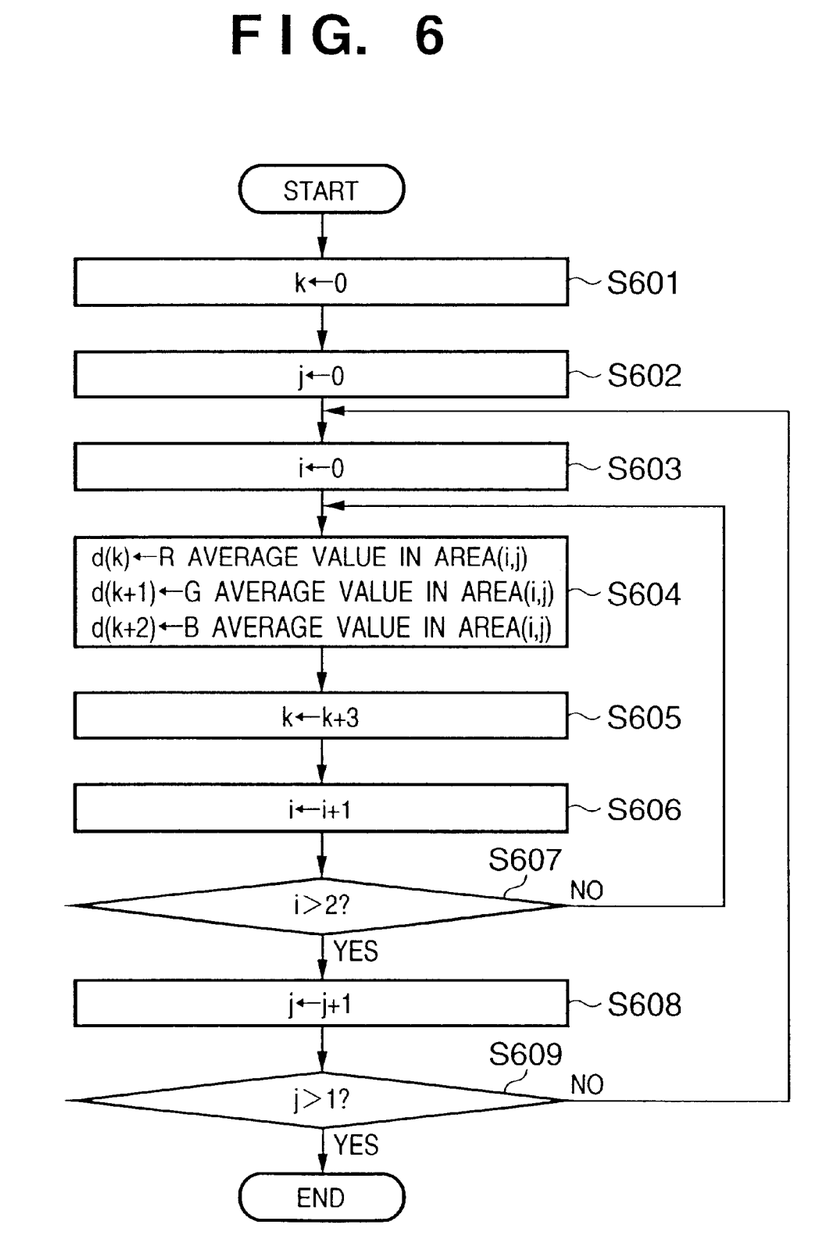
FIGS. 6 and 7 are flowcharts showing a procedure for calculating an image feature amount according to the first embodiment.
Figure 7:
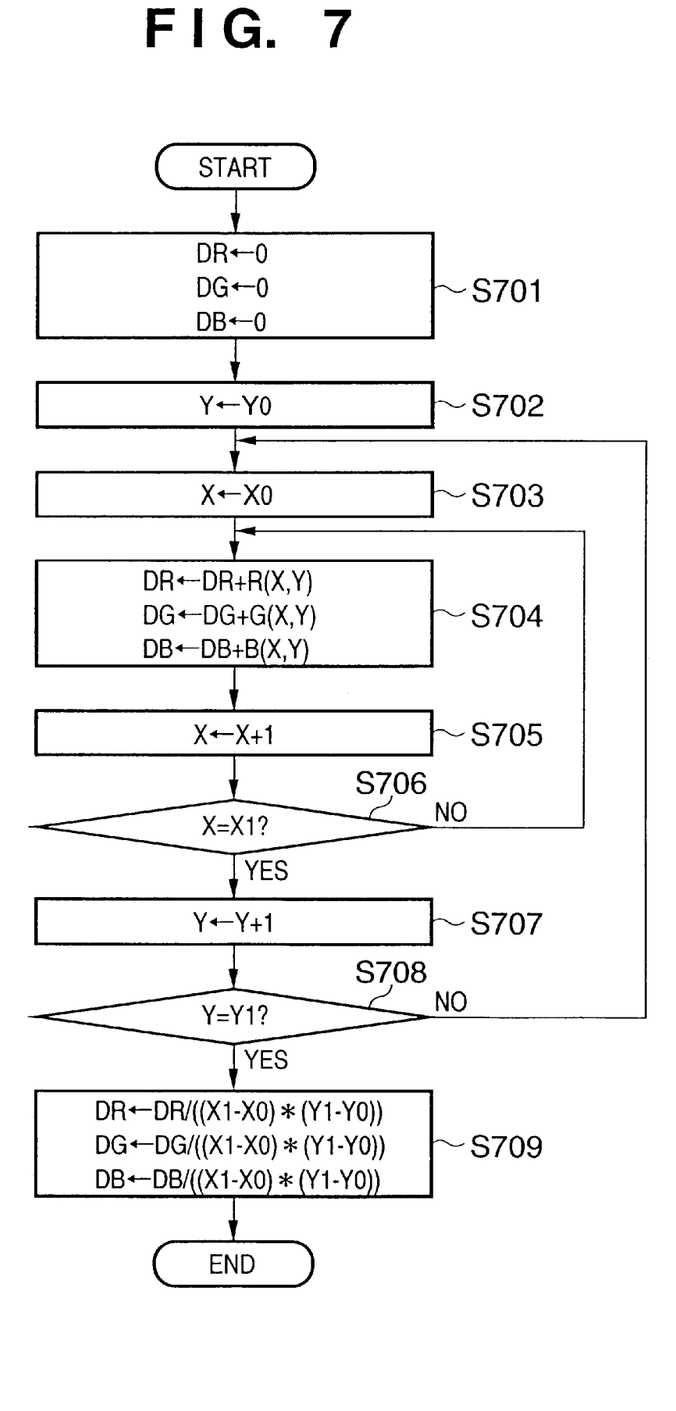

FIG. 5 is an explanatory diagram of image division according to the present embodiment. FIGS. 6 and 7 are flowcharts showing the procedure for calculating an image feature amount according to the present embodiment.

As shown in FIG. 5, the size of drawing area 31 is horizontal W pixels×vertical H pixels. The area is divided into horizontal three areas and vertical two areas, i.e., total 6 areas, as areas (0,0), (1,0), . . . , (2,1). Then, average RGB values in each area are calculated, and total 18 values are used as the image feature amount of the illustration.

Next, the flow of the feature amount calculation processing according to the present embodiment will be described with reference to FIGS. 6 and 7.

First, at step S601, a variable k is initialized to "0". Next, at step S602, a variable j is initialized to "0". Next, at step S603, a variable i is initialized to "0".

At step S604, the R average value in an area (i,j) is substituted into an element d(k) which is a k-th element in an array d, then the G average value in the area (i,j) is substituted into the element d(k+1), and the B average value in the area (i,j) is substituted into the element d(k+2). The method of calculating the R, G, B average values at step S604 will be described later with reference to the flowchart of FIG. 7.

Next, at step S605, the variable k is incremented by three, and at step S606, the variable i is incremented by one. At step S607, the variable i is compared with "2". If the variable i is greater than "2", the process proceeds to step S608, otherwise, the process returns to step S604. By this loop, the feature amount is calculated and stored with regard to the areas (0,0), (1,0) and (2,0) in FIG. 5.

If i=3 holds at step S607, the process proceeds to step S608. At step S608, the variable j is incremented by one. At step S609, the variable j is compared with "1", and if the variable j is less than "1", the process returns to step S603. By this processing, the feature amount is calculated and stored with regard to the areas (0,1), (1,1) and (2,1). On the other hand, at step S609, if the variable j is greater than "1", the process ends.

When the processing is completed, the image feature amount of the illustration is stored in the array d( ) having 18 elements. Note that the image is divided into equal 6 rectangular areas for the purpose of feature amount calculation, however, the divided areas are not limited to the rectangular areas but more complicated shapes are available. Further, the number of divided areas may be changed. It is apparent for the persons skilled in the art that when the number of areas is changed, the number of elements of the feature amount is not 18 but changed in accordance with the number of areas, and further, the branching conditions at steps S607 and S609 are also changed.

Next, the method of calculating the RGB average values in each area will be described with reference to FIG. 7.

The image data is stored as three arrays R(X,Y), G(X,Y), B(X,Y). Note that $0 \leq X < W$ holds, $0 \leq Y < H$ holds, and the upper left corner of the image is a starting point (0,0). In the flowchart of FIG. 7, the average densities in partial areas $X0 \leq X < X1$ and $Y0 \leq Y < Y1$ are calculated, and the RGB average densities are returned to variables DR, DG and DB.

At step S604, as the area (i,j) corresponds to

X0=W×i/3, X1=W×(i+1)/3

Y0=H×j/2, Y1=H×(j+1)/2 constants X0, X1, Y0 and Y1 are initialized as above and then the processing in the flowchart of FIG. 7 is performed.

First, at step S701, the variables DR, DG and DB are initialized to "0". At step S702, the variable Y is initialized to "Y0", and at step S703, the variable X is initialized to "X0".

Next, at step S704, the value of R(X,Y) is added to the variable DR. Similarly, the value G(X,Y) is added to the variable DG, and the value of B(X,Y) is added to the variable DB. At step S705, the variable X is incremented by one, and at step S706, the variable X is compared to the constant X1. If these values are not equal, the process returns to step S704. By this loop, addition regarding the RGB values on the same y coordinate is performed in the area (i,j).

If X=X1 holds at step S706, the process proceeds to step S707, at which the variable Y is incremented by one. Then at step S708, the variable Y is compared with the constant Y1. If both values are not equal, the process returns to step S703. The loop from step S703 to step S708 is repeated until Y=Y1 holds. Thus respective sums of the RGB values are obtained in the area (i,j).

If Y=Y1 holds at step S708, the process proceeds to step S709. At step S709, the variables DR, DG and DB are respectively divided by (X1−X0)×(Y1−Y0). The expression (X1−X0)×(Y1−Y0) means the number of pixels in the area. Accordingly, by the processing at step S709, the variables DR, DG and DB become average density values resulted from division of the sums of pixel densities in the area by the number of pixels.

[Step S203]

At step S203, the similar image search is performed based on the above-calculated image feature amount. The hard disk device 106 holds N image data, with feature amounts of the respective images calculated in advance by the above method. The image data may be stored in a standard format such as JPEG or FlashPix, otherwise, may be stored in a unique format in a so-called RDBMS (Relational Database Management System). Further, the image feature amounts are stored in a two-dimensional array D(n,i) having a size of N×18 (note that $0 \leq n < N$ and $0 \leq i < 18$ hold).

At this time, an interval S(n) between a presented image and the n-th image is defined by:

$$S(n) = \sum_i (D(n, i) - d(i))^2$$

As the interval S(n) is smaller, it is determined that the similarity between the images is higher.

The similar image search is performed by, first, calculating the interval S(n) between all the N images and the presented image ($0 \leq n < N$), then selecting M images ($0 < M < N$) sequentially from an image with the minimum S(n). The procedure for calculation of the interval S(n) as the first half of the above processing will be described with reference to FIG. 8, and the procedure for selection of M images as the last half of the above processing will be described with reference to FIG. 9.

Figure 8:
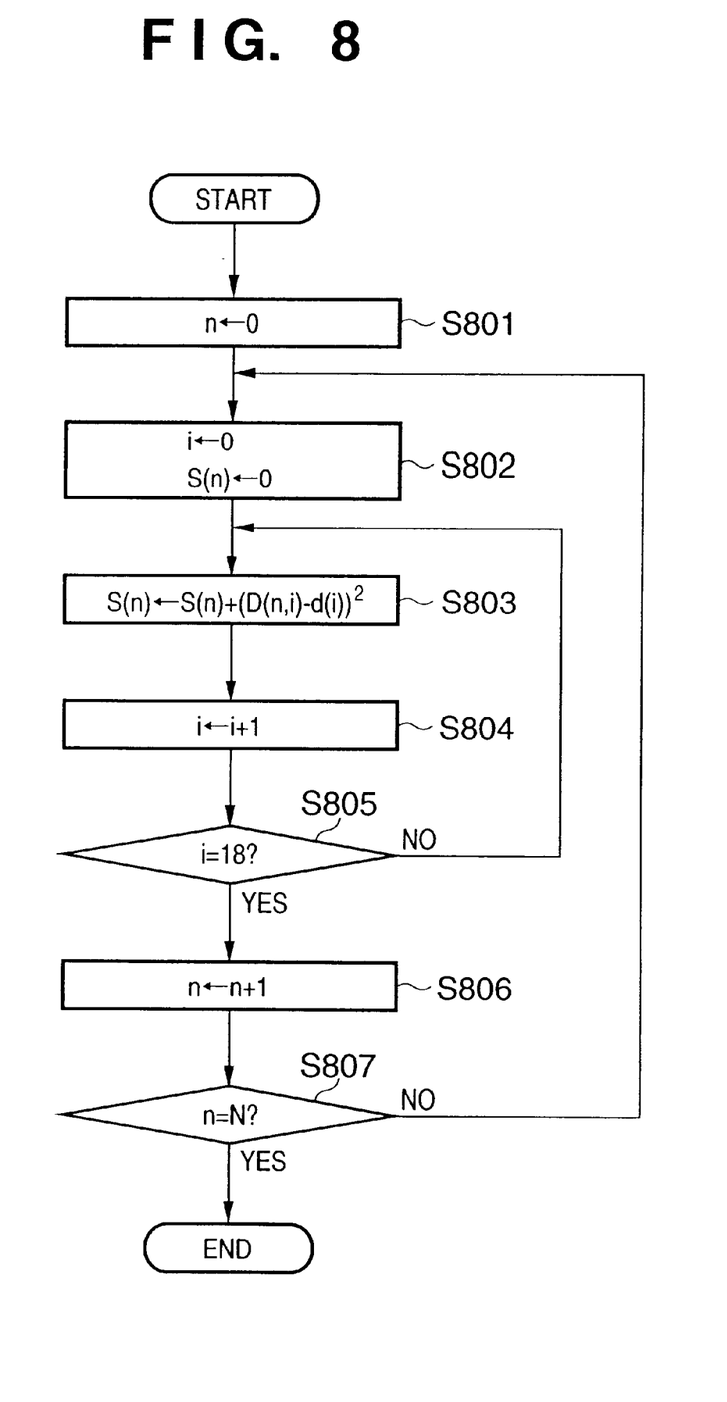
FIG. 8 is a flowchart showing a procedure for calculating an interval S(n)

First, at step S801, the variable n is initialized to "0", and at step S802, the variable i and the value of the interval S(n) are initialized to "0". At step S803, the square of the difference between D(n,i) and d(i) is added to the value of S(n). Thereafter, at step S804, the variable i is incremented by one, and at step S805, the variable i is compared with "18". If i=18 holds, the process proceeds to step S806, otherwise, returns to step S803. By the loop from step S803 to S805, the interval between the n-th image and the presented search source image (the image drawn in the drawing area 21) is calculated.

Next, at step S806, the variable n is incremented by one. Then, at step S807, the variable n is compared with N, and if n≠N holds, the process returns to step S802. Thus, the loop formed with steps S802 to S807 is repeated until n=N holds, thereby the distances between the N images stored in the database and the search source image can be calculated. Then at step S807, if n=N holds, the process ends.

By the above processing, the intervals between the presented image and all the stored images (N images) are stored in the array S(n). Next, the procedure for selecting M images from an image with the minimum interval and storing image numbers into an array T( ) will be described with reference to FIG. 9.

Figure 9:
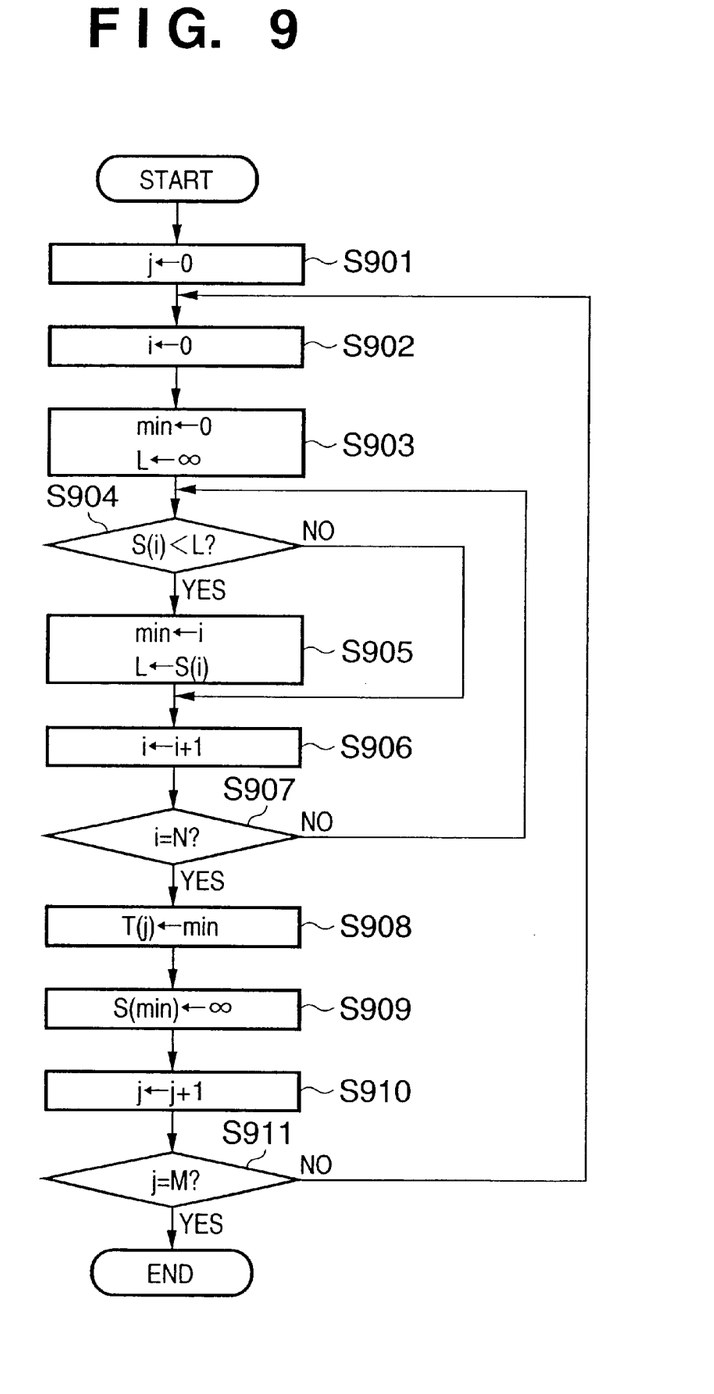
FIG. 9 is a flowchart showing a procedure for selecting M images.

First, at step S901, the variable j is initialized to "0", and at step S902, the variable i is initialized to "0". Next, at step S903, a variable min is initialized to "0", and a variable L is initialized to a sufficient large value.

At step S904, the value of S(i) is compared with the variable L, and if S(i)<L holds, the process proceeds to step S905, otherwise, skips step S905 and proceeds to step S906.

At step S905, the value i is substituted into a variable min, and the value of S(i) is substituted into the variable L. Then at step S906, the variable i is incremented by one. At step S907, the variable i is compared with N, and if these values are equal, the process proceeds to step S908, otherwise, returns to step S904. By the processing performed in the loop of steps S904 to S907, a number i of image with the minimum interval is stored into the variable min. Accordingly, as the value min is substituted into T(j) at step S908, the image number as a search result is stored into T(j).

Next, at step S909, a sufficiently large value is substituted into S(min). Then at step S910, the variable j is incremented by one. At step S911, the variable j is compared with M, and if these values are equal, the process ends, otherwise, returns to step S902. At this time, by the processing at step S908, as the interval registered in the array T( ) has a sufficiently large value, the image having the image number registered in the array T( ) is excluded from the repeated processing at steps S904 to S907. Accordingly, by repeating the processing until j=M holds at step S911, the image numbers are stored into the array T(j) ($0 \leq j < M$) sequentially from the image having the highest similarity.

[Step S204]

At step S204, based on the obtained search result, the search result is displayed in the image display areas 26a to 26h in the operation image as shown in FIG. 3. In the present embodiment, the similar images found by the above processing are reduced and displayed in the image display areas 26a to 26h. An image corresponding to the highest similarity image number T(0) is displayed in the area 26a, then an image corresponding to the next highest similarity image number T(1) is displayed in the area 26b. Finally, an image corresponding to the lowest similarity image number is displayed in the image display area 26h.

Note that to display reduced images, the stored image data may be decoded and reduced, or in a case where low-resolution icon data (or thumbnail data) exist as in the standard format FlashPix, such icon data may be obtained and displayed.

At this time, in the present embodiment, the ID's of images displayed in the image display areas 26a to 26h are stored in an array U(n) ($0 \leq n < 8$), and when step S204 is performed next, it is determined whether or not the same image is to be displayed in the same image display area. If it is determined that the same image is to be displayed in the same position, the already-displayed state is maintained. This prevents wasteful processing to update an already-displayed image with the same image.

Figure 10:
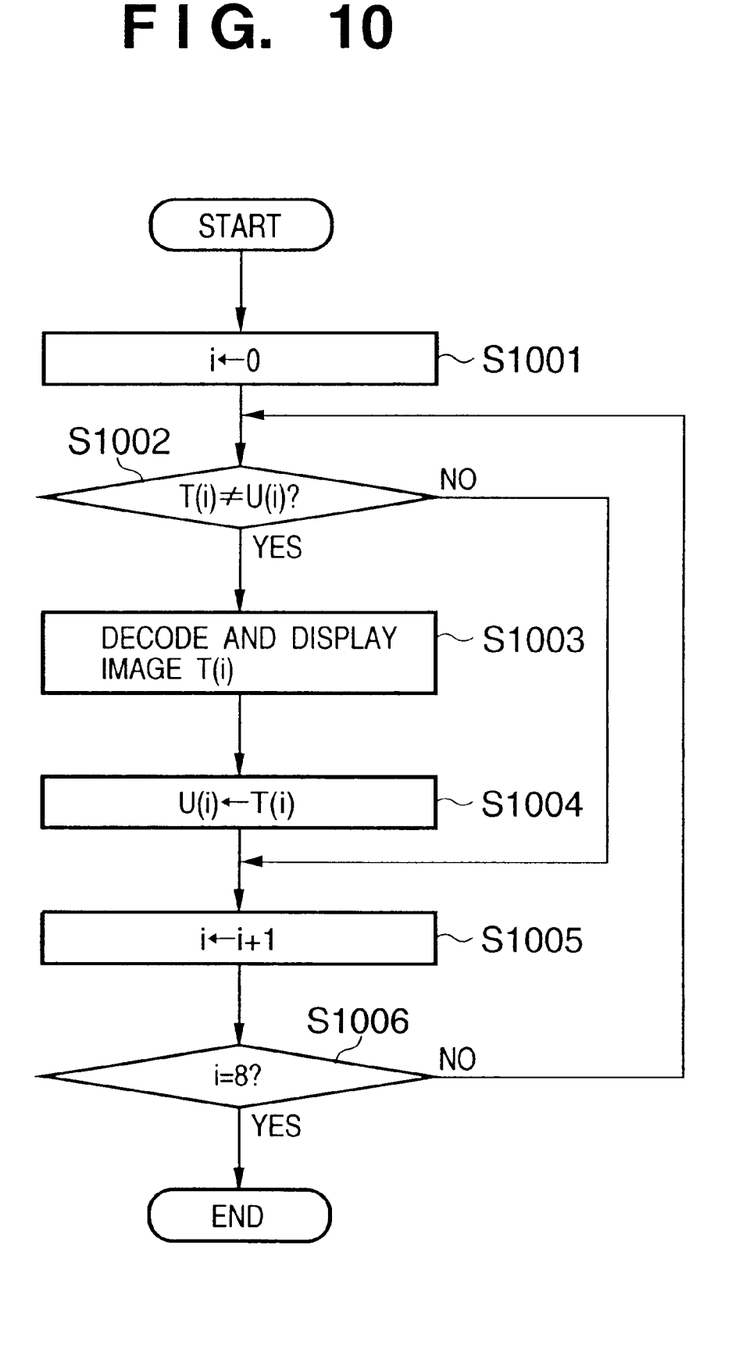
FIG. 10 is a flowchart showing a procedure of search result display processing according to the first embodiment.

FIG. 10 is a flowchart showing a procedure of search result display processing according to the first embodiment. Note that image numbers of images displayed in the display areas 26a to 26h as a result of a previous search processing are stored in the arrays U(0) to U(7). When a new search condition is set and images (T(0) to T(7)) are obtained from the new search, the processing shown in the flowchart of FIG. 10 is performed to display reduced images or thumbnail of the images obtained from the new search. First, at step S1001, the variable i is initialized to "0". Next, at step S1002, the value of T(i) is compared with the value of U(i), and if these values are equal, the process proceeds to step S1005, otherwise, proceeds to step S1003. As described above, image number (ID) of image to be displayed as a search result is stored in T(i) (See step S908). At step S1003, the T(i)-th image icon data is read from the hard disk device 106, then the data is decoded, and displayed in a corresponding display area (one of the areas 26a to 26h). Then, at step S1004, the value of T(i) is substituted into U(i).

At step S1005, the variable i is incremented by one. At step S1006, the variable i is compared with "8". The value "8" is the number of view displayed icons (the number of 8 image display areas (26a to 26h)). If i=8 holds, the process ends, otherwise, the process returns to step S1002.

When the above processing is performed, the number of image data currently displayed in the image display areas 26a to 26h are stored in the arrays U(0) to U(7). Then, if the image search is performed again with another search condition, the numbers of image data to be displayed next are stored in the arrays T(0) to T(7). Accordingly, by comparing the contents in the arrays T(0) to T(7) with the contents in the arrays U(0) to U(7) (step S1002), it can be determined whether or not the same image is to be displayed in the same position. If the same image is to be displayed in the same position, the display processing for the image and the U(i) update (steps S1003 and S1004) are skipped. This prevents the wasteful processing to display the same image in the same position, and increases the speed of displaying the search result images, and further, contributes to improvement in processing efficiently.

[Step S205]

At step S205, it is determined whether or not the Exit button 28 for instruction to terminate the processing has been depressed (clicked). If the button 28 has been depressed, the search processing ends, otherwise, the processing returns to step S201 to continue drawing the illustration as the search source image.

As described above, by effectively utilizing the display of previous search result images, the speed of view display of search result images can be increased, and an efficient image search operation can be performed.

Second Embodiment

Generation of image icons by reading and decoding of image data causes the heaviest load on the view display of image icons. However, the speed of view display can be increased and the response of search processing can be improved by caching already-generated image icons in the RAM 105 or the hard disk device 106.

In the second embodiment, a construction to realize high-speed view display by caching will be described. Note that the arrangement of the devices, the search processing and the like are the same as those in the first embodiment. The difference from the first embodiment is the similar image display processing at step S204. Hereinbelow, the similar image display processing according to the second embodiment will be described.

[Step S204]

In the operation image shown in FIG. 2, similar images found by the similar image search processing are reduced and displayed in the display areas 26a to 26h. As in the case of the first embodiment, an image corresponding to the highest similarity image number T(0) is displayed in the image display area 26a, and an image corresponding to the next highest similarity image number T(1) is displayed in the image display area 26b. In this manner, the images are sequentially displayed in the image display areas.

To display reduced images, the stored image data may be decoded and reduced, or in a case where low-resolution icon data exists as in the standard image format FlashPix, the icon data may be displayed.

Further, as in the case of the first embodiment, the numbers (ID's) of the images displayed in the image display areas 26a to 26h are stored in the array U(n) ($0 \leq n < 8$), and when step S204 is performed next, it is determined whether or not the same image is to be displayed in the same position.

Thus, the execution of wasteful processing to display the same image in the same position can be prevented.

Further, the icon data (reduced images) once used for display are stored as cache data in the RAM 105 or the hard disk device 106, and the stored data are read when the data are required. Thus high-speed display can be realized.

Figure 11:
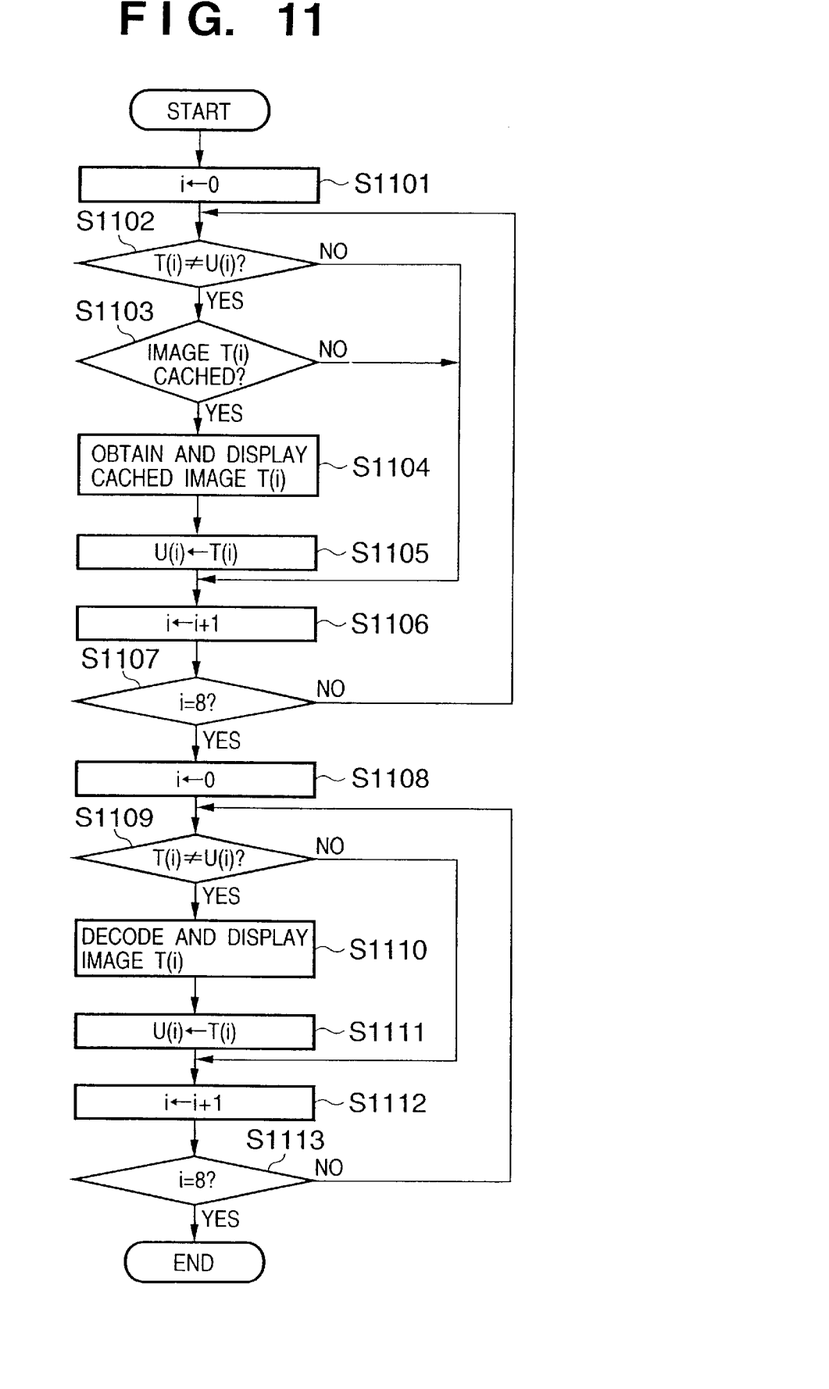
FIG. 11 is a flowchart showing the procedure of search result display processing according to a second embodiment.

FIG. 11 is a flowchart showing the procedure of search result display processing according to the second embodiment. At step S1101, the variable i is initialized to "0". At step S1102, the value of T(i) is compared with the value of U(i), and if these values are equal, as it is not necessary to update the display in a corresponding image display area, the process skips to step S1106 (as in the case of the first embodiment).

If T(i)≠U(i) holds at step S1102, the process proceeds to step S1103. At step S1103, it is determined whether or not the i-th icon image data T(i) is cached. If the icon data is cached, the process proceeds to step S1104, otherwise, proceeds to step S1106. At step S1104, the cached T(i)-th icon image data is obtained and displayed in a corresponding image display area (26*a* to 26*h*). Then at step S1105, the value of T(i) is substituted into U(i).

At step S1106, the variable i is incremented by one, and at step S1107, the variable i is compared with "8". The value "8" is the number of view displayed icons. If i=8 holds, the process proceeds to step S1108, otherwise, returns to step S1102. By the processing at steps S1101 to S1107, among image data as hits in the search, images whose icon image data are cached in the RAM 105 or the hard disk device 106 are displayed first. In this manner, as icons are sequentially displayed from icons available for high-speed display, it seems as if the system operates at a high. Further, as the display of already-displayed image is skipped, the load on the processing can be reduced by removing wasteful processing.

The process proceeds to step S1108 and subsequent steps. The processing from step S1108 to S1113 is the same as that from step S1001 to S1006 described in the first embodiment. By the processing at steps S1108 to S1113, the display is updated in the image display area corresponding to a case where T(i)≠U(i) holds and the data of T(i) is not cached.

The present invention can be applied to a system constituted by a plurality of devices (e.g., a host computer, an interface, a reader and a printer) or to an apparatus comprising a single device (e.g., a copy machine or a facsimile apparatus).

Further, the object of the present invention can be also achieved by providing a storage medium storing program code for performing the aforesaid processes to a system or an apparatus, reading the program code with a computer (e.g., CPU, MPU) of the system or apparatus from the storage medium, then executing the program.

In this case, the program code read from the storage medium realizes the functions according to the embodiments, and the storage medium storing the program code constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program code.

Furthermore, besides aforesaid functions according to the above embodiments are realized by executing the program code which is read by a computer, the present invention includes a case where an OS (operating system) or the like working on the computer performs a part or entire processes in accordance with designations of the program code and realizes functions according to the above embodiments.

Furthermore, the present invention also includes a case where, after the program code read from the storage medium is written in a function expansion card which is inserted into the computer or in a memory provided in a function expansion unit which is connected to the computer, CPU or the like contained in the function expansion card or unit performs a part or entire process in accordance with designations of the program code and realizes functions of the above embodiments.

As described above, according to the present invention, the speed of view display of images as search results can be increased, and an efficient image search operation can be realized.

As many apparently widely different embodiments of the present invention can be made without departing from the spirit and scope thereof, it is to be understood that the invention is not limited to the specific embodiments thereof except as defined in the appended claims.

What is claimed is:

1. An image search apparatus comprising:

search means for performing an image data search based on an input search condition;

display means for displaying a view of plural images indicating plural image data obtained from the search by said search means;

update means for updating the view displayed by said display means based on image data obtained from a new search by said search means;

determination means for determining whether or not each of the plural images displayed by said display means is the same as an image after an update by said update means; and control means for, if said determination means determines that the displayed image is the same as the image after the update by said update means, skipping the update by said update means.

2. The image search apparatus according to claim 1, wherein said display means displays the view of images obtained from reduction processing on the image data obtained from the search.

3. The image search apparatus according to claim 1, wherein said display means displays the view of images obtained from icon data included in the image data obtained from the search.

4. The image search apparatus according to claim 1, wherein said determination means determines whether or not each of the plural images displayed by said display means is the same as the image after the update by said update means by determining whether or not image data indicated by the displayed image is the same as image data to be indicated by the image after the update.

5. The image search apparatus according to claim 4, further comprising storage means for storing a display position of each of the plural images displayed by said display means and identification information to specify the image data indicated by the image displayed in the display position, linked with each other, wherein it is determined whether or not the image data of each of the plural images displayed by said display means is the same as the image data to be indicated by the image after the update, by obtaining the identification information of the image data corresponding to the displayed image from said storage means, and comparing the obtained identification information with the identification information of the image data to be indicated by the image after the update.

6. The image search apparatus according to claim 1, further comprising cache means for caching image data indicating the plural images in the view displayed by said display means, wherein said update means updates the view by utilizing the image data cached by said cache means.

7. The image search apparatus according to claim 6, wherein said update means performs update processing by using the image data cached by said cache means first.

8. An image search method comprising:

a search step of performing an image data search based on an input search condition;

a display step of displaying a view of plural images indicating plural image data obtained from the search at said search step;

an update step of updating the view displayed at said display step based on image data obtained from a new search at said search step;

a determination step of determining whether or not each of the plural images displayed at said display step is the same as an image after an update at said update step; and a control step of, if it is determined at said determination step that the displayed image is the same as the image after the update at said update step, skipping the update at said update step.

9. The image search method according to claim 8, wherein at said display step, the view of images obtained from reduction processing on the image data obtained from the search are displayed.

10. The image search method according to claim 8, wherein at said display step, the view of images obtained from icon data included in the image data obtained from the search are displayed.

11. The image search method according to claim 8, wherein at said determination step, it is determined whether or not each of the plural images displayed at said display step is the same as the image after the update at said update step by determining whether or not image data indicated by the displayed image is the same as image data to be indicated by the image after the update.

12. The image search method according to claim 11, further comprising a step of providing storage means for storing a display position of each of the plural images displayed at said display step and identification information to specify the image data indicated by the image displayed in the display position, linked with each other, wherein at said determination step, it is determined whether or not the image data of each of the plural images displayed at said display process is the same as the image data to be indicated by the image after the update, by providing obtaining the identification information of the image data corresponding to the displayed image from said storage means, and comparing the obtained identification information with the identification information of the image data to be indicated by the image after the update.

13. The image search method according to claim 8, further comprising a cache step of caching the image data indicating the images in the view displayed at said display step, wherein at said update step, the view is updated by utilizing the image data cached at said cache step.

14. The image search method according to claim 13, wherein at said update step, update processing by using the image data cached at said cache step is performed first.

15. A computer-readable medium holding a control program for performing an image search by a computer, said program comprising:

code of search process for performing an image data search based on an input search condition;

code display process for displaying a view of plural images indicating plural image data obtained from the search at said search process;

code of update process for updating the view displayed at said display process based on image data obtained from a new search at said search process;

code of determination process for determining whether or not each of the plural images displayed at said display process is the same as an image after an update at said update process; and code of control process for, if it is determined at said determination process that the displayed image is the same as the image after the update at said update process, skipping the update at said update process.

16. The medium according to claim 15, wherein at said display process, the view of images obtained from reduction processing on the image data obtained from the search are displayed.

17. The medium according to claim 15, wherein at said display process, the view of images obtained from icon data included in the image data obtained from the search are displayed.

18. The medium according to claim 16, wherein at said determination process, it is determined whether or not each of the plural images displayed at said display process is the same as the image after the update at said update process, by determining whether or not image data indicated by the displayed image is the same as image data to be indicated by the image after the update.

19. The medium according to claim 18, further comprising code of process for providing storage means for storing a display position of each of the plural images displayed at said display process and identification information to specify the image data indicated by the image displayed in the display position, linked with each other, wherein at said determination process, it is determined whether or not the image data of each of the plural images displayed at said display process is the same as the image data to be indicated by the image after the update, by providing obtaining the identification information of the image data corresponding to the displayed image from said storage means, and comparing the obtained identification information with the identification information of the image data to be indicated by the image after the update.

20. The medium according to claim 15, further comprising code of cache process for caching the image data indicating the images in the view displayed at said display process, wherein at said update process, the view is updated by utilizing the image data cached at said cache process.

21. The medium according to claim 20, wherein at said update process, update processing by using the image data cached at said cache process is performed first.

* * * * *